March 20, 1934.   C. W. GANNETT   1,951,477
MEANS FOR CONNECTING WHEEL SUPPORTS TO BARROW FRAME
Filed May 7, 1928   2 Sheets-Sheet 1
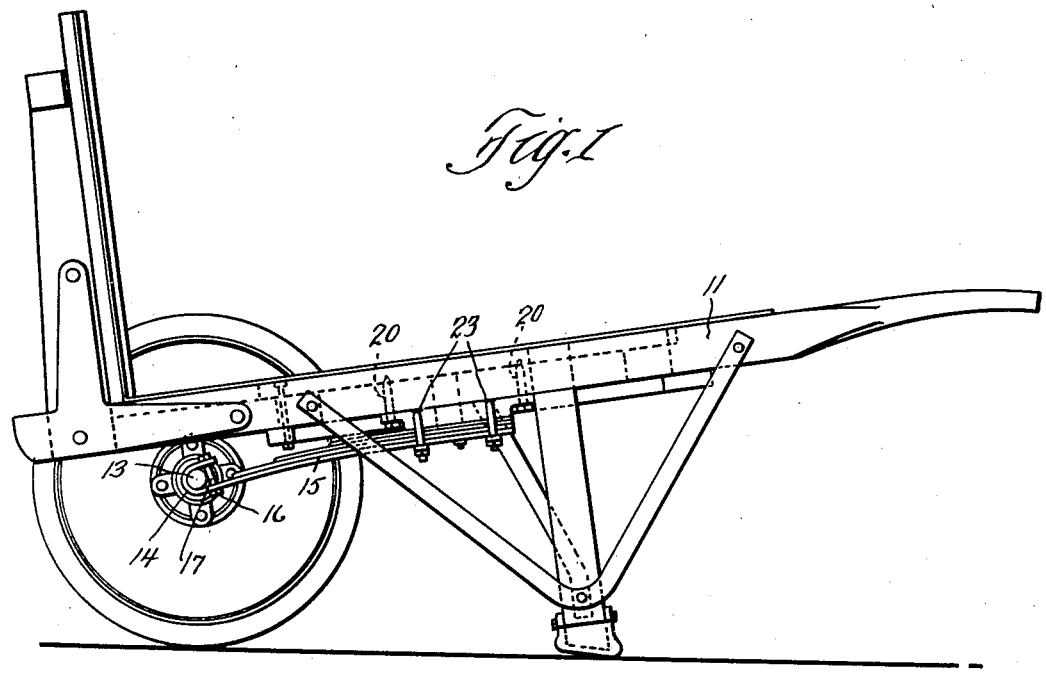
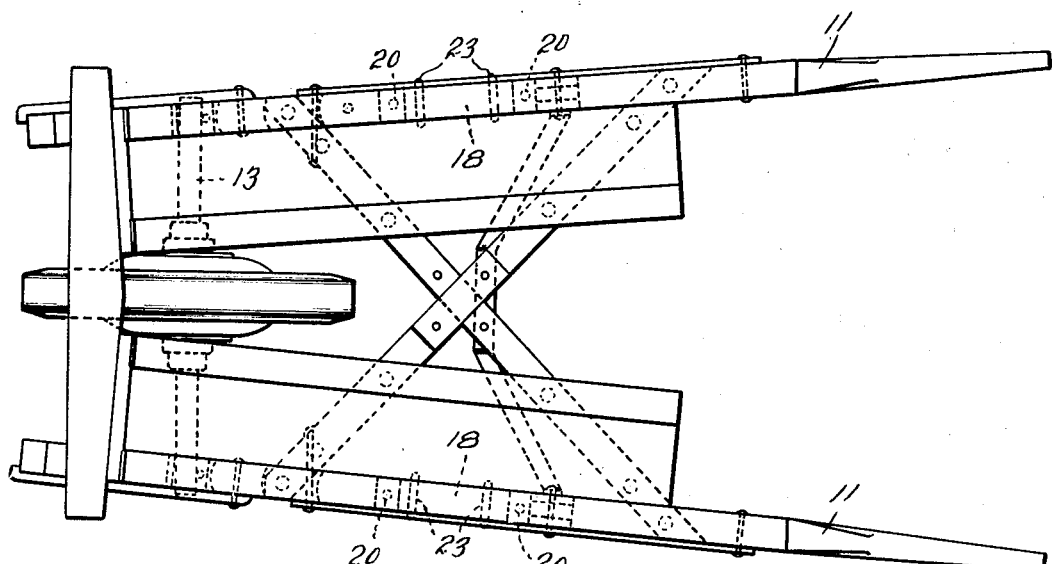
Inventor
C. W. Gannett
By
Hull Brock & West
Attorney March 20, 1934.  C. W. GANNETT  1,951,477
MEANS FOR CONNECTING WHEEL SUPPORTS TO BARROW FRAME
Filed May 7, 1928    2 Sheets-Sheet 2
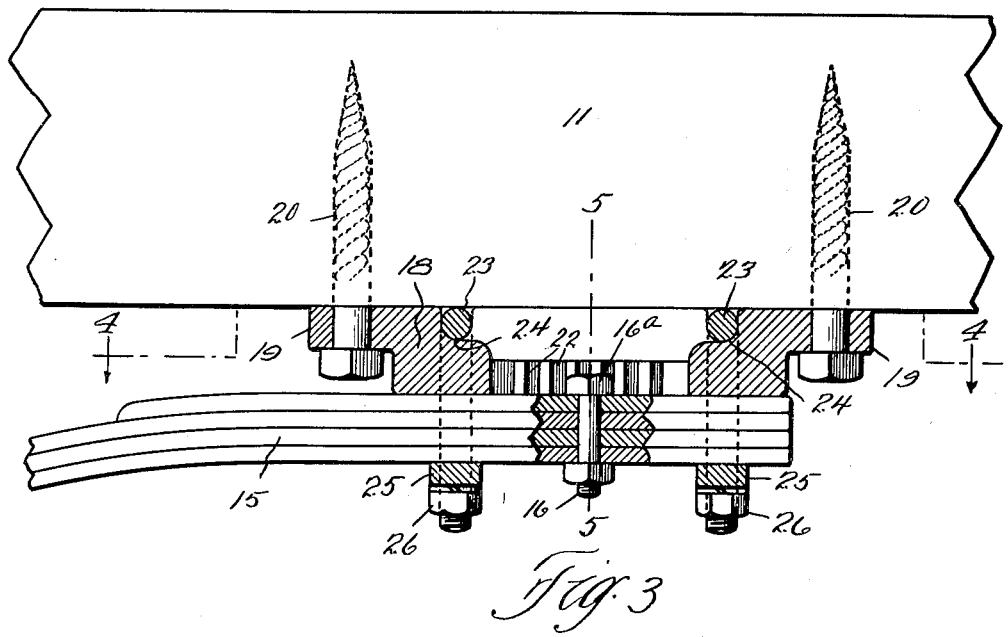
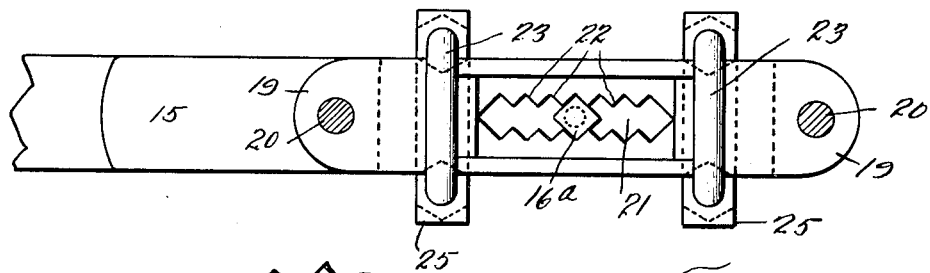
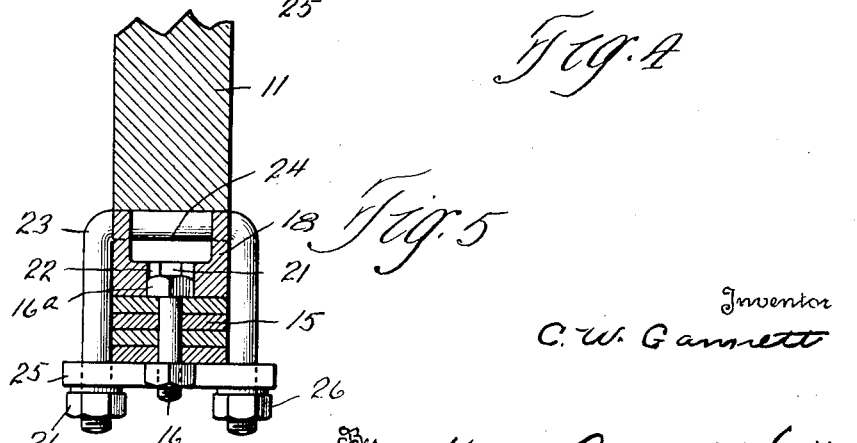
Inventor
C. W. Gannett
By Hill Brock & West
Attorney

UNITED STATES PATENT OFFICE 1,951,477

MEANS FOR CONNECTING WHEEL SUPPORTS TO BARROW FRAME

Chauncey W. Gannett, Wellington, Ohio

Application May 7, 1928, Serial No. 275,636

7 Claims. (Cl. 267—41)

This invention relates generally to wheelbarrows and more particularly to the means for connecting the wheel to said barrow.

I have illustrated my invention as applied to a wheelbarrow of the type employed about brickyards but it will be understood that the invention is applicable to all types of wheelbarrows employing a single centrally disposed wheel and a pair of side members or thills to which the wheel carrying means can be attached.

The object of the invention is to provide a yieldable support or carrying means for the axle of the wheel and also to provide for the longitudinal adjustment of said supporting means whereby the position of the wheel can be adjusted as desired.

With these various objects in view the invention consists in the novel features of construction and in the combination of the various parts all of which will be fully described hereinafter and set forth in the appended claims.

In the drawings forming a part of this specification, Fig. 1 is a wheelbarrow provided with my improved wheel supporting means; Fig. 2 is a top plan view of the same; Fig. 3 is a sectional view of the means for connecting the wheel carrying springs to the side members of the wheelbarrow; Fig. 4 is a sectional plan view on the line 4—4 of Fig. 3; and Fig. 5 is a transverse sectional view on the line 5—5 of Fig. 3.

In the practical embodiment of my invention I employ a wheelbarrow 10 having side members 11 which in the present instance are shown converging but it will be understood that they can be arranged parallel if so desired. Centrally arranged between the side members is the wheel 12 which may be of any desired construction and having an axle 13 extending therethrough. The ends of this axle 13 are mounted in the looped ends 14 of the springs 15, said springs 15 being the lowermost and the longest of a series of springs which are connected together by a bolt 16 and secured to the under sides of the side members 11 of the wheelbarrow frame. A bolt or pin 17 passing through the looped end of each spring 15 prevents the dislocation of the axle 13.

In order to securely fasten the rear ends of the springs to the wheelbarrow frame I employ cast or forged members 18 having apertured ears 19 at each end and through which the connecting screws or bolts 20 are passed into the side members of the frame for the purpose of connecting the cast or forged member 18 to the wheelbarrow frame. The member 18 is formed with a longitudinally extending opening 21 the side edges of which are made serrated or angular as shown at 22 in order to properly secure the head 16ª of the bolt 16 to prevent said bolt turning. The springs 15 are placed against the lower side of the member 18 with the head 16ª of the bolt 16 in engagement with the serrated or angulated edge of the opening 21.

U-shaped clip bolts 23 straddle the member 18 adjacent each end, the central portions of these clip bolts seating in transverse grooves 24 produced in the member 18 so that the member can fit close against the plain bottom edge or side of the side member 11 of the wheelbarrow frame. A plate 25 is arranged in connection with each U-shaped clip bolt 23 and nuts 26 are applied to the threaded ends of the bolts for the purpose of securely fastening the springs 15 to the member 18, said member 18 being securely fastened to the wheelbarrow frame through the bolts or screws 20. The rear ends of the springs can be adjusted longitudinally as desired by shifting the head of the bolt 16 into engagement with any of the series of serrations and after such adjustment is had the nuts 26 are retightened and the springs will then be securely held in position. By this means it is possible to properly adjust the springs 15 which carry at their forward ends the axle 13 of the centrally disposed wheel 12.

The means herein shown and described for connecting the wheel carrying springs to the wheelbarrow frame are cheap in construction, easily fabricated and quickly and easily assembled for the purposes intended.

Having thus described my invention, what I claim is:—

1. In a device of the kind described, the combination with a member, longitudinally slotted and transversely grooved, of a plurality of spring leaves, and a bolt for uniting their rear ends, the head of said bolt resting in the longitudinal slot in the member, and clips arranged to straddle said member and secure the united leaf ends thereto.

2. In a device of the kind described, the combination with a member provided with ears at each end, longitudinally slotted and transversely grooved upon its upper face, of a plurality of spring leaves, a bolt for uniting them, the head of said bolt being positioned in the longitudinal slot of the member, and clip bolts resting in the transverse grooves, and plates and bolts for connecting the spring leaves to said member.

3. In a wheel barrow, a pair of side members, a wheel and axle disposed therebetween, a pair of generally longitudinally extending leaf type springs supported at their forward ends by the wheel axle and at rearward portions thereof connected to the side members, the connection for at least one of said springs being adjustable to longitudinally adjust the spring to adjust the position of the wheel axle, and the connection comprising a base rigidly secured to the side member upon which the leaf spring may be longitudinally shifted, clamp means associated with the base embracing the leaf spring for securing it to the base in any adjusted position, a bolt extending through the leaf spring, and a longitudinally disposed series of female interlocking means on the base engageable severally by a portion of the bolt for predetermining a plurality of longitudinal adjustment positions for the spring independently of the securing means.

4. In a wheel barrow, a pair of side members, a wheel and axle disposed therebetween, a pair of generally longitudinally extending leaf type springs supported at their forward ends by the wheel axle and at rearward portions thereof connected to the side members, the connection for at least one of said springs being adjustable to longitudinally adjust the spring to adjust the position of the wheel axle, and the connection comprising a base rigidly secured to the side member upon which the leaf spring may be longitudinally shifted, clamp means associated with the base embracing the leaf spring for securing it to the base in any adjusted position, a bolt extending through the leaf spring to rigidly clamp the leaves thereof together in longitudinally fixed relation, and a longitudinal exposed series of recesses on the base selectively interlockable with the head of the bolt for predetermining a plurality of longitudinal adjustment positions for the spring independently of the clamp means.

5. In a wheel barrow, a pair of side members, a wheel and axle disposed therebetween, a pair of generally longitudinally extending leaf type springs supported at their forward ends by the wheel axle and at rearward portions thereof connected to the side members, the connection for at least one of said springs being adjustable to longitudinally adjust the spring to adjust the position of the wheel axle, and the connection comprising a base rigidly secured to the side member upon which the leaf spring may be longitudinally shifted, clamp means associated with the base embracing the leaf spring for securing it to the base in any adjusted position, an element securing the leaves of the leaf spring in predetermined relation, and a longitudinally disposed series of interlocking means on the base engageable severally by a portion of the said securing element for predetermining a plurality of longitudinal adjustment positions for the spring.

6. In a wheel barrow, a pair of side members, a wheel and axle disposed therebetween, a pair of generally longitudinally extending leaf type springs supported at their forward ends by the wheel axle and at rearward portions thereof connected to the side members, the connection for at least one of said springs being adjustable to longitudinally adjust the spring to adjust the position of the wheel axle, and the connection comprising a base rigidly secured to the side member upon which the leaf spring may be longitudinally shifted, clamp means associated with the base embracing the leaf spring for securing it to the base in any adjusted position, clamping means for the leaf spring to secure the leaves thereof in predetermined relation, and a longitudinally disposed series of interlocking means on the base engageable severally by a portion of the clamping means for predetermining a plurality of longitudinal adjustment positions for the spring.

7. In a wheel barrow, a pair of side members, a wheel and axle disposed therebetween, a pair of generally longitudinally extending leaf type springs supported at their forward ends by the wheel axle and at rearward portions thereof connected to the side members, the connection for at least one of said springs being adjustable to longitudinally adjust the spring to adjust the position of the wheel axle, and the connection comprising a base rigidly secured to the side member upon which the leaf spring may be longitudinally shifted, clamp means associated with the base embracing the leaf spring for securing it to the base in any adjusted position, disposing means for the leaf spring to dispose the leaves thereof in predetermined longitudinal relative relation, a longitudinally disposed series of interlocking means on the base, and means associated with the disposing means, disposed externally of the spring as a whole and movable longitudinally bodily therewith engageable severally with the interlocking means for predetermining a plurality of longitudinal adjustment positions for the spring.

CHAUNCEY W. GANNETT.